UNITED STATES PATENT OFFICE.

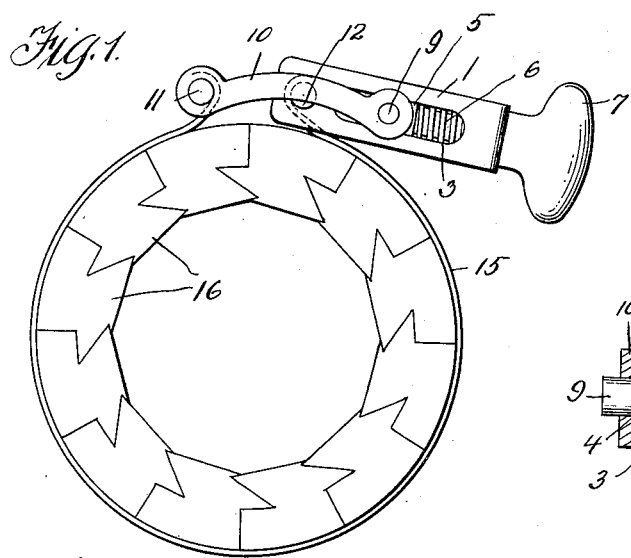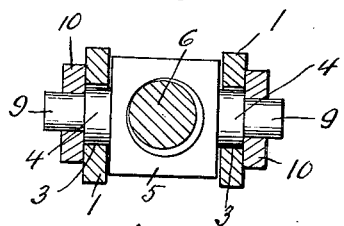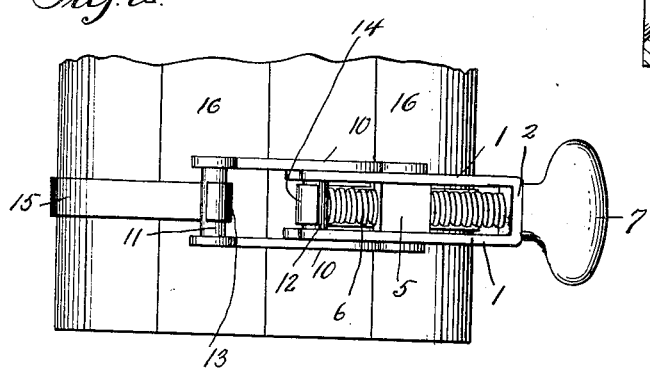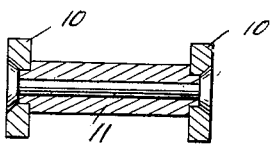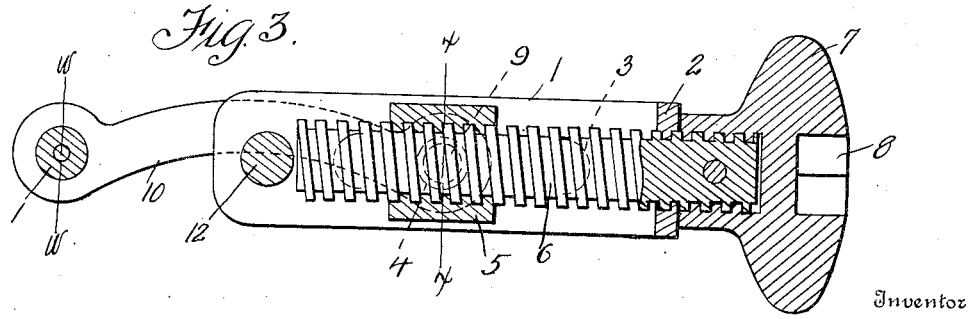

ALBERT H. SCHWERD, JR., OF PITTSBURG, PENNSYLVANIA.

COLUMN-CLAMP.

938,344.  Specification of Letters Patent.  Patented Oct. 26, 1909.

Application filed April 22, 1909. Serial No. 491,525.

*To all whom it may concern:*

Be it known that I, ALBERT H. SCHWERD, Jr., a citizen of the United States of America, residing at Pittsburg, in the county of Allegheny and State of Pennsylvania, have invented certain new and useful Improvements in Column Clamps, of which the following is a specification, reference being had therein to the accompanying drawing.

This invention relates to column clamps, and more particularly to a clamp used in the manufacture of columns for maintaining the component parts thereof in a set or assembled position, while said parts are becoming fixed to one another or seasoned.

The object of the invention is to provide a novel column clamp that will insure a perfect cylindrical form without the use of wedges, or adjustment of the parts of the column other than by the clamp.

Another object of this invention is to provide a clamp that can be easily and quickly handled to bind the component parts of a column together, the clamp being positive in its action, powerful as a clamping medium, and highly efficient for the purposes for which it is intended.

The above objects are attained by a clamp having a binding element that can be used in connection with columns of various orders, the binding element retaining the parts of the column together without injuring the periphery or exterior surfaces of a column. The clamp is designed whereby it can be easily placed in engagement with a column and then tightened to firmly bind the parts of the column while the jointed parts are adhering or becoming connected together.

The invention will be hereinafter considered in detail and then specifically pointed out in the appended claims, and reference will now be had to the drawings forming part of this specification, wherein there is illustrated a preferred embodiment of the invention, but it is to be understood that the structural elements thereof can be varied or changed without departing from the spirit or scope of the invention.

In the drawings, Figure 1 is an end view of a column with the clamp attached thereto, Fig. 2 is a plan of the same, Fig. 3 is an enlarged longitudinal section of a portion of the clamp, Fig. 4 is a cross sectional view taken on the line X—X of Fig. 3, and Fig. 5 is a similar view taken on the line W—W of Fig. 3.

To put my invention into practice, I provide the parallel arms 1 of a metallic yoke 2 with longitudinally disposed slots 3 and extending into said slots are oppositely disposed bearings 4 of a screw block 5. Adjustably mounted in the block 5 is a longitudinal screw 6 having the rear end thereof extending through the yoke 2 and provided with a fixed knob 7. The knob 7 is provided with a rectangular socket 8 in alinement with the screw 6, whereby the end of a crank or similar tool (not shown), can be inserted in the knob 7 for rotating said knob and the screw when a sufficient leverage cannot be obtained by gripping the knob 7. The bearings 4 of the screw block 5 are provided with trunnions 9 for curved arms 10 having the outer ends thereof connected by a transverse pin 11. The outer ends of the yoke arms 1 are connected by a transverse pin 12 and these pins are adapted to hold the hook-shaped ends 13 and 14 of a metallic resilient strap 15 adapted to embrace and surround the column 16. The curved arms 10 permit of the clamp being placed in proximity to the column, and with the ends of the strap 15 in engagement with the pins 11 and 12, it is only necessary to rotate the screw 6 to force the pin 12 toward the pin 11 and firmly bind the strap 15 upon the column; the end of the knob 7 engaging the yoke and forcing the yoke toward the pin 11, while the screw block 5 draws the pin 11 toward the pin 12.

An important characteristic of my invention resides in the use of the metallic strap 15, which permits of the entire inner gripping surface of said strap engaging the periphery of the column, the very fact that the ends of the strap are drawn together, causes said strap to conform to a circle, which will be true for the purposes for which it is intended.

Having now described my invention, what I claim as new, is:—

1. A column clamp, comprising a yoke, arms pivotally supported by said yoke, a strap having hook-shaped ends adapted to be held by said yoke and by said arms, and means carried by said yoke for drawing the ends of said strap toward one another, said means including a screw block for moving said pivoted arms, and an adjustable screw carried by said yoke for moving said block.

2. A column clamp, comprising a yoke, a screw block movably mounted in said yoke, a screw adjustably carried by said yoke for moving said block, arms pivotally carried by said block, and a strap having the ends thereof detachably connected to said arms and to said yoke.

In testimony whereof I affix my signature in the presence of two witnesses.

ALBERT H. SCHWERD, Jr.

Witnesses:
K. H. BUTLER,
A. J. TRIGG.